United States Patent [19]
Aaron

[11] Patent Number: 6,092,762
[45] Date of Patent: Jul. 25, 2000

[54] TAPE LEADER PIN CLAMP AND METHOD FOR SECURING SAME TO LEADER PIN ASSEMBLY

[75] Inventor: Robert C. Aaron, Meridian, Id.

[73] Assignee: Hewlett-Packard Company, Palo Alto, Calif.

[21] Appl. No.: 09/150,872

[22] Filed: Sep. 10, 1998

[51] Int. Cl.[7] ........................ G11B 15/66; G11B 23/107
[52] U.S. Cl. .................. 242/899; 242/332.4; 242/348.2; 226/92; 360/137
[58] Field of Search .............................. 242/332.4, 348.2, 242/532.1, 582, 899; 226/92; 360/137

[56] References Cited

U.S. PATENT DOCUMENTS

| 4,131,305 | 12/1978 | Lopata ........................................ 242/74 |
| 4,364,529 | 12/1982 | Barto, Jr. et al. .................... 242/332.4 |

FOREIGN PATENT DOCUMENTS

0924703A1  6/1999  European Pat. Off. .

OTHER PUBLICATIONS

European Search Report.

Primary Examiner—John Q. Nguyen

[57] ABSTRACT

A leader pin assembly for connecting tape to tape drive equipment, such as those used in magnetic tape storage systems, is disclosed. The leader pin assembly includes a leader pin and a flexible element covering at least a part of the leader pin. A clip secures the flexible element to the leader pin, the clip being adapted and constructed to be crimped in securing relation over the flexible element. The tape can be secured between the leader pin and the flexible element. The clip can be fabricated from a flexible metal such as stainless steel, specifically #300 stainless steel. The clip can be provided with an inner diameter slightly smaller than the outer diameter of the flexible element. The clip can be provided as a generally annular cylindrical member having a longitudinal opening, with a pair of beveled, substantially parallel edges forming the longitudinal opening. The flexible element and the clip can form an integral one-piece unit. The flexible element can be located on a center section of the leader pin. The flexible element can be an annular cylindrical member substantially surrounding a center section of the leader pin. The flexible element can include at least one edge which extends beyond the clip when the clip is secured over the flexible element. The flexible element can be fabricated from an elastomeric material such as rubber. The flexible element can be fabricated from urethane or, more preferably, SANTOPRENE®. A method for making leader pin assembly for connecting tape to tape drive equipment, such as those used in magnetic tape storage systems, is disclosed. In the first step of the method, a leader pin is provided. Next, a flexible element covering at least a part of the leader pin is provided. Then, a clip adapted and constructed to be crimped in securing relation over the flexible element is provided. Finally, the flexible element is secured to the leader pin by crimping.

19 Claims, 2 Drawing Sheets

TAPE LEADER PIN CLAMP AND METHOD FOR SECURING SAME TO LEADER PIN ASSEMBLY

CROSS-REFERENCE TO RELATED APPLICATIONS

This application is related to copending U.S. patent application Ser. No. 09/055,016, filed Apr. 3, 1998, titled "Tape Leader Pin Assembly and Method for Making the Same", the entirety of which is incorporated by reference herein.

FIELD OF THE INVENTION

This invention relates to the field of tape and tape equipment, and, more specifically, to mechanical elements and assemblies for connecting tape to tape drive equipment, such as those used in magnetic tape storage systems employed in computer systems, audio/visual systems, and the like.

BACKGROUND OF THE INVENTION

Several systems and methods exist for winding various types of tape. In computer and audio/visual systems, data storage systems are provided to read data from and/or write data to data storage media, such as magnetic tape. The data storage systems utilizing magnetic tape data storage media typically contain sophisticated data processing equipment and mechanical assemblies which usually include a drive unit for winding the tape.

Current tape winding systems use one or more spindles around which the tape is wound. To move tape in such systems, a drive system turns the first spindle in a first direction, thereby winding the tape from the first spindle onto the second spindle. By using the drive unit to turn the second spindle in an opposite direction, the tape may be wound from the second spindle to the first spindle.

For portability and tape storage purposes, it is often desirable to remove the tape from the system (hereinafter the "machine") which reads from and/or writes to the tape. Typically, the tape may either be housed entirely within a cassette, which has at least two spindles (the tape being attached at each end to a respective spindle), or within a cartridge which has one spindle to which one end of the tape is attached.

In the latter design, the second end of the tape may be removed from the cartridge and drawn inside the machine, where the second end of the tape is wound around a second spindle. When desired, the tape may be wound back inside the spindle within the cartridge, and the cartridge may then be removed from the machine. The latter (single-spindle) cartridge design has a significant advantage over cartridge designs employing two or more spindles. Specifically, cartridges having only one spindle are much more space efficient. For example, if the cartridge is square-shaped, tape wound within the single-spindle cartridge employs significantly more space within the cartridge than tape wound within multiple-spindle cartridges, where a great amount of cartridge space is left unused. However, since one end of the tape within a single-spindle cartridge is commonly removed from the cartridge, drawn into the machine, and wound around a spindle within the machine, problems arise in the design of an element or assembly which permits the machine to "grab" or "pick" and manipulate the tape end. A number of designs are well known in the industry, but each brings with it one or more deficiencies. Each design performs the same basic function (i.e., provides an element or assembly to which the machine may attached in order to grab or pick the tape end from the cartridge, thereby allowing the machine to pull the tape end inside of the machine and secure the tape end to a spindle within the machine). For purposes of this discussion, the machine mechanism which "picks" the tape end from the cartridge will hereinafter be called the "picker."

In one cartridge design, the tape end to be drawn inside the machine is secured to an element called a leader block. One example of this cartridge design is a cartridge made by IBM and designated Model 3480. When this cartridge is not being used, the leader block forms part of the cartridge wall itself (e.g., part of a perimeter wall or a corner of the cartridge). With the cartridge installed within it, the machine inserts the picker into a hole within the leader block. The picker then pulls the leader block into the machine from its position on the cartridge. The tape is secured to the leader block by being wrapped around a pin which is snap-fitted into a groove in the leader block. The pin is usually made of an elastomeric material, and is slightly larger than the groove into which it fits, so that the tape is firmly secured between the pin and the groove when the pin is snapped into place within the groove. The leader block shape of this cartridge design is also important in that once the leader block is fully drawn into the machine, one edge of the leader block forms an exterior surface of the spindle within the machine. Therefore, this leader block edge is curved to match the round exterior shape of the spindle.

A significant disadvantage of the leader block design is its size and shape. For a machine to read from or write to tapes stored within a cartridge using a leader block tape connection, the machine must have a picker which is compatible with the rather unusual design, size, and shape of the leader block. Specifically, the picker must fit within the hole in the leader block, while the internal mechanism of the machine must be designed to accept and secure the leader block (and its particular shape) within the machine. For the above-described leader block design, this means that the machine spindle must be designed to integrally house the leader block. These constraints dictate a relatively large leader block size, and require fairly specific machine and spindle design parameters to allow the leader block to be manipulated, moved, and secured inside the machine. A relative large leader block results in either a larger cartridge, a larger machine, or both.

In another cartridge design, a tape splice is used rather than a leader block. Such a cartridge design is employed in Digital Linear Tape cartridges manufactured by Quantum Corporation. In this design, a piece of stiff and resilient connector tape (e.g., mylar) is secured to the end of the tape within the cartridge. The opposite end of the connector tape is formed to be releasably attached to the picker, which is also a stiff and resilient piece of connector tape. The piece of connector tape secured to the tape within the cartridge may have a large hole in its free end, which is "grabbed" and pulled by a hook in the picker. The tape splice cartridge design addresses the problems inherent to the leader block tape connection design: the relatively large sized and unusually-shaped connection between the tape and picker. In the connector tape cartridge design, the spliced mylar-to-tape connection may be wound around the machine spindle, with the tape being wound on the machine spindle over the mylar-to-tape connection.

However, the tape splice cartridge design has its own design deficiencies. For example, reliability problems exist in the design of the stiff and resilient connection tape used to connect the picker to the cartridge tape. The connection tape must be stiff enough to resist bending during the connecting procedure (when the machine connects the connector tape to the cartridge tape), but must be flexible enough to easily bend while being wound around a spindle. Therefore, a compromise must be made to either stiffen the connection tape (thereby making winding more difficult and increasing the chance of incorrectly-wound tape) to facilitate easier "picking", or relax the connector tape (thereby making the picking procedure more difficult or unreliable). This compromise can result in a connection or winding which is undesirable. For example, incorrectly-wound tape may lead to tape damage and/or misfeeding of the tape in the cartridge or in the machine. Also, when a desired connection is not made and the machine attempts to wind the tape into the machine, the machine can "swallow" the picker (the disconnected connector tape). When is thus "swallowed" into the machine, the machine usually must be serviced to extract the picker from the machine. Conversely, when a desired disconnection procedure fails, attempts to release the cartridge from the machine can cause to damage to the tape, the cartridge, and/or the machine. In short, the compromise necessary to provide a connector tape which is both stiff enough to facilitate reliable connections and disconnections while being relaxed enough to be properly wound results in a less-than-optimal design.

The tape splice cartridge design has other undesirable features. For example, when the tape is wound around a spindle, the mylar-to-tape connection may cause the wound tape above the mylar-to-tape connection to be thicker than the other areas along the circumference of the wound tape (creating a "bump" in the wound tape). This bump caused by the mylar-to-tape connection is amplified as more tape is wound on the spindle, and has an undesirable effect of creating a "once-around" type of runout on the spindle which can distort a recorded signal on the tape. Another disadvantage of the tape splice cartridge design is that during winding operations, the mylar-to-splice connection passes over the recording head(s) of the machine. This action exposes the recording head to potential damage and/or excessive wear.

As described above, although designs exist for connecting the tape of a cartridge to the picker of the machine, each design suffers from significant drawbacks, including inefficient connection size, connection elements which create difficulty in establishing compatibility between cartridges and machines, and connection elements which are not optimally designed for both winding and connecting operations. Therefore, a need exists for a tape-to-machine connection which is space efficient (is as small as possible), affords compatibility with a number of different machines into which a cartridge may be inserted (preferably without design changes to the machines), and has a simple connection design for dependable connection and disconnection operations.

A tape-to-machine connection that overcomes many of the disadvantages of known designs is described in copending U.S. patent application Ser. No. 09/055,016, filed Apr. 3, 1998, titled "Tape Leader Pin Assembly and Method for Making the Same". This application describes a leader pin assembly and a method of making a leader pin assembly for use in connecting tape with elements of a machine which manipulate the tape (e.g., move the tape, wind or unwind the tape from a spindle). In one preferred embodiment, the leader pin assembly includes three parts. The first part is a leader pin with an elongated "barbell" shape. At least one pair of flanges flanks a center section of the leader pin around which the tape is wrapped. The second part is an flexible element which is fitted over the tape wrapped around the center section of the leader pin. The third part is a clip fitted around the flexible element to secure the flexible element in a snug position around the tape and leader pin.

In another preferred embodiment, the flexible element and the clip are unitary, either constituting one element or being attached to one another. In other preferred embodiments, the entire leader pin assembly is molded in place around the tape, or the tape is attached to a surface of the leader pin assembly by a bonding material or other fastener.

In those embodiments employing a clip, the flexible element is held in place by a C-shaped spring clamp having an inner diameter slightly smaller than the outer diameter of the flexible element. The clamp, whether over or in conjunction with the flexible element, is snapped into place over the tape wound around the center section of the leader pin.

As recognized in Ser. No. 09/055,016, this arrangement presents several inherent problems. For example, the spring-fit nature of the clip can result in deformation of the flexible element and uneven clamp force on the tape. Deformation of the flexible element may require removal of material from the flexible element to maintain concentricity. Furthermore, proper operation of the cartridge requires for the clamp to retain the tape such that the tape can withstand a linear force (in a direction pulling the tape away from the leader pin assembly) of 16 Newtons without permitting any tape slippage. Recent tests have determined that this standard is not being met by current clamping structure and methods.

It is apparent from the foregoing that the need exists for a tape leader pin clamp and method for securing the clamp to a leader pin assembly that will minimize deleterious deformation of the flexible element while maintaining adequate and uniform force to retain the tape on the leader pin.

SUMMARY OF THE INVENTION

In order to accomplish the present invention, there is provided a leader pin assembly for connecting tape to tape drive equipment, such as those used in magnetic tape storage systems. The leader pin assembly includes a leader pin around which tape is wrapped, and a flexible element covering at least a part of the tape-wrapped leader pin. A clip secures the flexible element to the leader pin, the clip being adapted and constructed to be crimped in securing relation over the flexible element.

The flexible element can be located on a center section of the leader pin. In a preferred embodiment, the flexible element is an annular cylindrical member substantially surrounding a center section of the leader pin. The flexible element can include at least one edge which extends beyond the clip when the clip is secured over the flexible element. The flexible element can be fabricated from an elastomeric material such as rubber. In a preferred embodiment, the flexible element is fabricated from urethane or, more preferably, SANTOPRENE®.

The clip can be fabricated from a flexible metal such as soft steel. In a preferred embodiment, the clip is fabricated from stainless steel, specifically #300 stainless steel. The clip can be provided with an inner diameter slightly smaller than the outer diameter of the flexible element. In a preferred embodiment, the clip is provided as a generally annular cylindrical member having a longitudinal opening, with a pair of beveled, substantially parallel edges forming the longitudinal opening. The flexible element and the clip can form an integral one-piece unit.

A method for making leader pin assembly for connecting tape to tape drive equipment, such as those used in magnetic tape storage systems, is disclosed. In the first step of the method, a leader pin is provided. Next, a flexible element covering at least a part of the leader pin is provided. Then, a clip adapted and constructed to be crimped in securing relation over the flexible element is provided. Finally, the flexible element is secured to the leader pin by crimping the clip over the flexible element.

Another method for making leader pin assembly for connecting tape to tape drive equipment, such as those used in magnetic tape storage systems, is disclosed. In the first step of the method, a leader pin is provided. Next, an integral clip/flexible element unit covering at least a part of the leader pin is provided, the clip/flexible element unit being adapted and constructed to be crimped. Finally, the clip/flexible element unit is crimped to the leader pin.

BRIEF DESCRIPTION OF THE DRAWINGS

A better understanding of the invention may be had from the consideration of the following detailed description taken in conjunction with the accompanying drawings, in which.

DETAILED DESCRIPTION OF THE PREFERRED EMBODIMENTS

Figure 1:
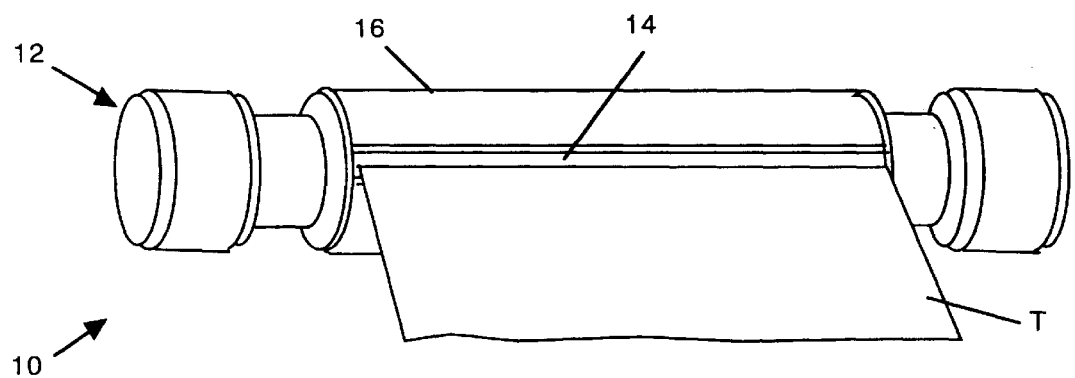
FIG. 1 is a perspective view of a first preferred embodiment of the leader pin assembly of the present invention.
Figure 2:
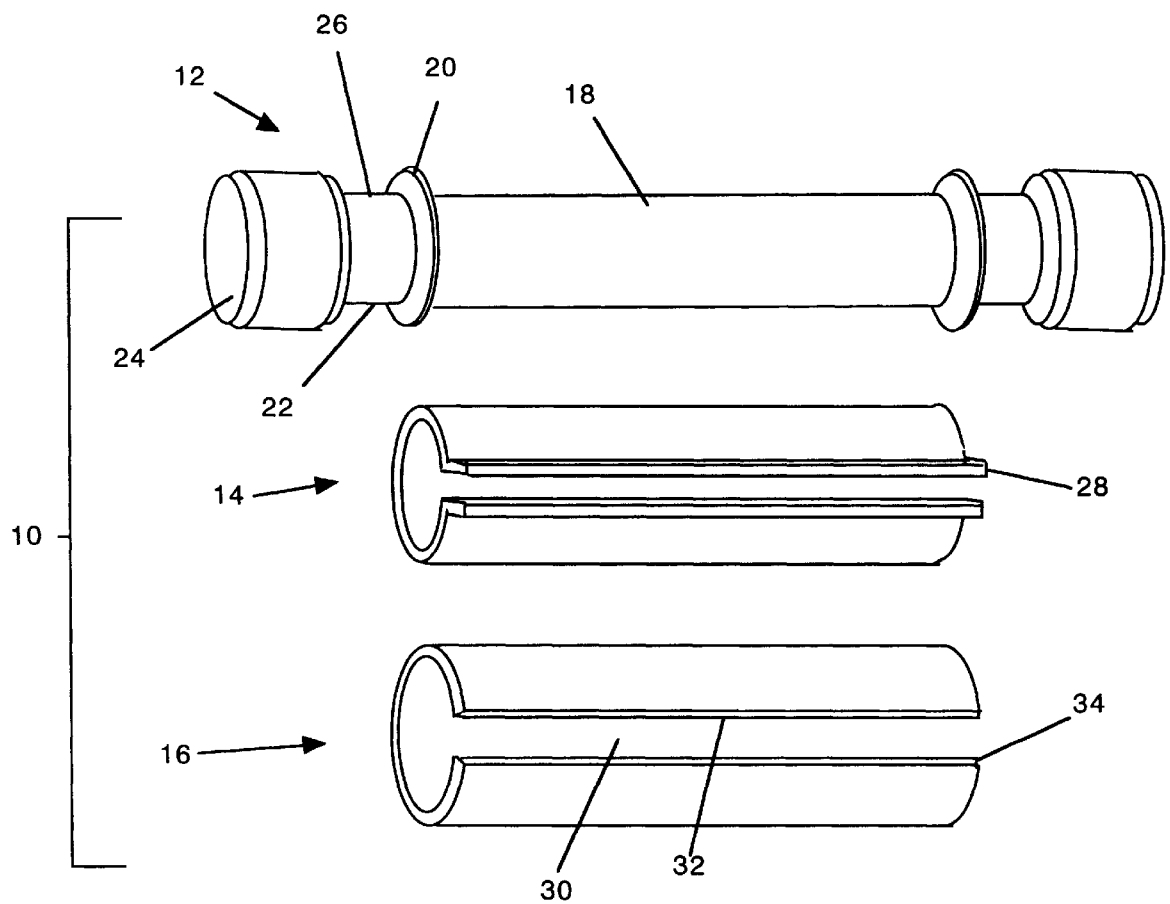
FIG. 2 is an exploded perspective view of the FIG. 1 embodiment.

The present invention is not limited to a specific embodiment illustrated herein. FIG. 1 illustrates a leader pin assembly 10 for connecting tape to tape drive equipment, such as those used in magnetic tape storage systems. The functioning of the leader pin assembly 10 within a machine is identical to that described in copending U.S. patent application Ser. No. 09/055,016, filed Apr. 3, 1998, titled "Tape Leader Pin Assembly and Method for Making the Same". The leader pin assembly 10 includes a leader pin 12 around which is wrapped a length of tape T, and a flexible element 14 covering at least a part of the tape-wrapped leader pin 12. A clip 16 secures the flexible element 14 to the leader pin 12. As can be seen in FIGS. 1 and 2, the leader pin 12 has a "barbell" shape, with an elongated center section 18 and a pair of flanges 20 at opposite ends thereof. A pair of extensions 22, substantially coaxial with the center section 18, extend from the flanges 20, and terminate in a pair of ends 24 having substantially the same diameter as the flanges 20. The flanges 20, extensions 22, and ends 24 define recesses 26 of the leader pin 12. The leader pin 12 can be fabricated from any suitable material, such as metal, plastic, composites, or ceramics. Steel, particularly stainless steel, is a preferred material.

The flexible element 14 is advantageously located on the center section 18 of the leader pin 12. As can be seen in FIG. 2, the flexible element 14 is preferably configured as an annular cylindrical member substantially surrounding the center section 18 of the leader pin 12. The flexible element 14 can include at least one edge 28 which extends beyond the clip 16 when the clip 16 is secured over the flexible element 14. The edge 28 serves to protect the tape T from the edges of the clip 16, as well as to act as a guide to ensure proper rotational registration of the flexible element 14 within the clip 16. The flexible element 14 can be fabricated from an elastomeric material such as rubber, urethane, or an engineered plastic. One engineered plastic particularly well-suited to this application is marketed under the trade name SANTOPRENE® by Advanced Elastomer Systems, L.P.

Figure 3:
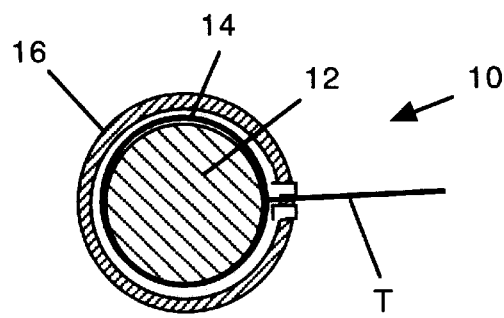
FIG. 3 is a sectional view taken generally along lines III—III of FIG. 1.

As seen in FIG. 2, the clip 16 can be provided as a generally annular cylindrical member having a longitudinal opening 30 defined by a pair of beveled, substantially parallel edges 32 having rounded corners 34. The edges 32 and rounded corners 34 facilitate easier manufacture of the leader pin assembly 10, as well as providing a degree of protection for the tape. The clip 16 can be fabricated from a suitable flexible metal that is capable of being crimped, that is, which will hold a shape into which it has been bent or compressed. It is contemplated that soft steel, preferably #300 stainless steel, is particularly well-adapted to such use, although any suitable material can be employed. As seen in FIG. 3, the clip 16 secures the flexible element 14 to the leader pin 12. When crimped into place, the inner diameter of the clip 16 is slightly smaller than the outer diameter of the flexible element 14.

Figure 4:
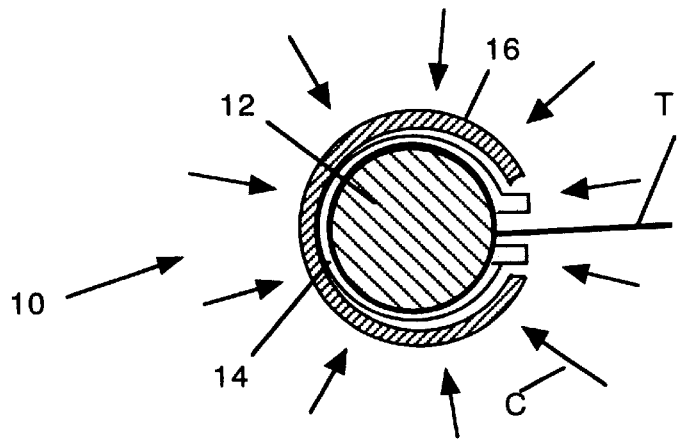
FIG. 4 is a sectional view of a leader pin assembly before crimping.

FIG. 4 shows the leader pin assembly 10 before crimping. At this stage, the flexible element 14 has been placed over the center section 18 of the leader pin 1 2, and the clip 16 has been placed over the flexible element 14. It can be seen that the inner diameter of the clip 16 is slightly greater than the outer diameter of the flexible element 14. The clip 16 is then crimped over the flexible element 14 using a crimping tool to exert compressive force radially inwardly, as indicated by the arrows C. Any suitable crimping tool can be used to accomplish crimping. One example is model number GSC-128 wt 400 manufactured by Thomas & Betts Co. of Elizabeth, N.J. If this specific tool is used, it may be advantageous to modify the crimping area of the tool by providing it with a diameter of approximately 2.5 mm.

Figure 5:
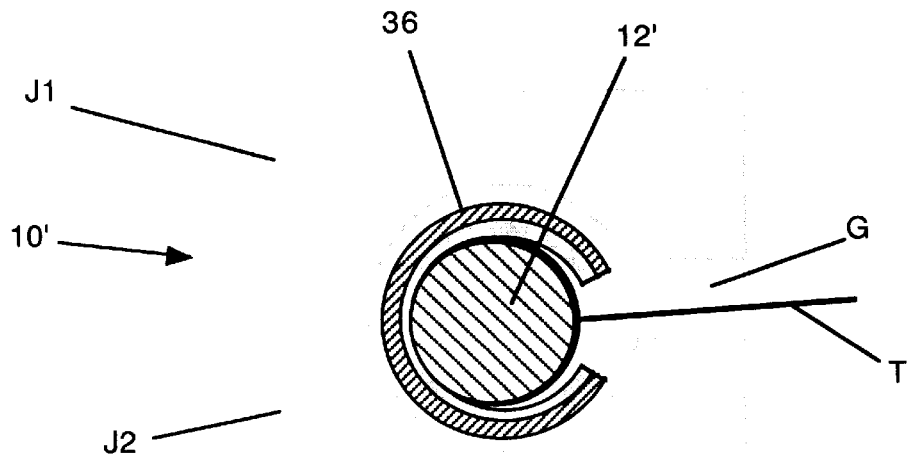
FIG. 5 is a sectional view of an alternative embodiment of a leader pin assembly before crimping.

FIG. 5 shows an alternative embodiment of a leader pin assembly 10' before crimping. In this embodiment, an integral clip/flexible element unit 36 is provided in place of the separate flexible element 14 and clip 16. At this stage, the clip/flexible element unit 36 has been placed over the center section 18' of the leader pin 12'. The clip/flexible element unit 36 is then crimped over the center section 18' using a crimping tool to exert compressive force radially inwardly, as indicated by the arrows C'. Any suitable crimping tool can be used to accomplish crimping, as set forth with respect to the previous example. FIG. 5 shows the jaws J1, J2 of the crimping tool, in which a gap G has been provided to prevent damage to the tape T during the crimping process. Tape protection is particularly important in data storage devices, as the tape in such applications is typically around 9 $\mu$m in thickness. By way of comparison, this is approximately three times thinner than tape commonly used in videocassettes.

With the clip or clip/flexible element unit crimped into place, it is contemplated that the leader pin assembly receives and retains tape within a cartridge as described in U.S. patent application Ser. No. 09/055,016. Of course, those of skill in the art may recognize that the leader pin assembly described herein could find utility elsewhere. Further, although the present invention has been described with reference to embodiments in which the tape is secured directly to the leader pin, it is also contemplated that various direct or indirect tape attachment arrangements could be employed to similar effect.

Although the preferred embodiment of the present invention has been illustrated, and that form described, it is readily apparent to those skilled in the art that various modifications may be made therein without departing from the spirit of the invention, or form the scope of the appended claims.

What is claimed is:

1. A leader pin assembly for attachment to tape, the leader pin assembly comprising the following:
    a leader pin having tape secured thereto;
    a flexible element attached to and covering at least a part of the leader pin; and
    a clip securing the flexible element to the leader pin, the clip being adapted and constructed to be crimped in securing relation over the flexible element.

2. A leader pin assembly according to claim 1, wherein the clip is fabricated from a flexible metal.

3. A leader pin assembly according to claim 2, wherein the clip is fabricated from a soft steel.

4. A leader pin assembly according to claim 3, wherein the clip is fabricated from stainless steel.

5. A leader pin assembly according to claim 4, wherein the clip is fabricated from #300 stainless steel.

6. A leader pin assembly according to claim 1, wherein the flexible element and the clip form an integral one-piece unit.

7. A leader pin assembly according to claim 1, wherein the flexible element is located on a center section of the leader pin.

8. A leader pin assembly according to claim 7, wherein the flexible element substantially surrounds a tape-wrapped center section of the leader pin.

9. A leader pin assembly according to claim 8, wherein the flexible element is a generally cylindrical member having a generally annular cross-section.

10. A leader pin assembly according to claim 9, wherein the clip has an inner diameter slightly smaller than the outer diameter of the flexible element.

11. A leader pin assembly according to claim 9, wherein the clip comprises a pair of beveled, substantially parallel edges forming the longitudinal opening.

12. A leader pin assembly according to claim 1, wherein the clip is a generally cylindrical member having a generally annular cross-section and a longitudinal opening.

13. A leader pin assembly according to claim 1, wherein the flexible element includes at least one edge which extends radially outwardly from the clip when the clip is secured over the flexible element.

14. A leader pin assembly according to claim 1, wherein the flexible element is fabricated from an elastomeric material.

15. A leader pin assembly according to claim 14, wherein the flexible element is fabricated from rubber.

16. A leader pin assembly according to claim 15, wherein the flexible element is fabricated from urethane.

17. A leader pin assembly according to claim 16, wherein the flexible element is fabricated from SANTOPRENE®.

18. A method for making a leader pin assembly for attachment to tape, the method comprising the following steps:
    providing a leader pin;
    securing tape to the leader pin;
    providing an integral clip/flexible element unit attached to and covering at least a part of the leader pin, the clip/flexible element unit being adapted and constructed to be crimped; and
    crimping the clip/flexible element unit to the leader pin wherein the tape is secured between the leader pin and the flexible element.

19. A method for making a leader pin assembly for attachment to tape, the method comprising the following steps:
    providing a leader pin;
    securing tape to the leader pin;
    providing a flexible element attached to and covering at least a part of the leader pin wherein the tape is secured between the leader pin and the flexible element;
    providing a clip adapted and constructed to be crimped in securing relation over the flexible element; and
    securing the flexible element to the leader pin by crimping the clip over the flexible element.

* * * * *